United States Patent
Yates et al.

(10) Patent No.: US 11,916,996 B1
(45) Date of Patent: Feb. 27, 2024

(54) TRANSACTIONAL READINESS PROBE

(71) Applicant: INTERNATIONAL BUSINESS MACHINES CORPORATION, Armonk, NY (US)

(72) Inventors: William Leslie Yates, Portsmouth (GB); Jade Monique Carino, Workingham (GB); James Edward Davies, Andover (GB); Lewis Haydn James, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/216,198

(22) Filed: Jun. 29, 2023

(51) Int. Cl.
| G06F 15/16 | (2006.01) |
| H04L 67/025 | (2022.01) |
| G06F 9/50 | (2006.01) |
| G06F 9/46 | (2006.01) |
| H04L 67/60 | (2022.01) |

(52) U.S. Cl.
CPC ............ *H04L 67/025* (2013.01); *G06F 9/466* (2013.01); *G06F 9/5038* (2013.01); *H04L 67/60* (2022.05)

(58) Field of Classification Search
None
See application file for complete search history.

(56) References Cited

U.S. PATENT DOCUMENTS

| 7,095,854 | B1 * | 8/2006 | Ginter ............... H04N 21/25875 380/231 |
| 7,624,176 | B2 | 11/2009 | Dickerson et al. |
| 8,650,292 | B2 | 2/2014 | Ruiz et al. |
| 10,284,646 | B2 | 5/2019 | Bohm et al. |
| 10,554,685 | B1 * | 2/2020 | McArdle ............. H04L 63/0272 |
| 11,222,298 | B2 * | 1/2022 | Abelow ............... G06Q 10/067 |
| 2017/0154037 | A1 | 6/2017 | Kozina et al. |
| 2017/0278108 | A1 * | 9/2017 | Hays .................. G06Q 20/4016 |
| 2021/0224059 | A1 | 7/2021 | Duvur et al. |

(Continued)

FOREIGN PATENT DOCUMENTS

| CN | 111142971 | 5/2020 |
| CN | 114884840 | 8/2022 |

OTHER PUBLICATIONS

Anonymous, "CICS", https://en.wikipedia.org/wiki/CICS, Accessed May 31, 2023; 21 Pages.

(Continued)

*Primary Examiner* — Phuoc H Nguyen
(74) *Attorney, Agent, or Firm* — Joseph P. Curcuru; Andrew D. Wright; Calderon Safran & Cole, P.C (57) ABSTRACT

A method, system, and computer program product are configured to: initiate a transaction in response to receiving a readiness probe request from a requesting system; set a probe flag for the transaction to a first state; send the transaction to a user application for processing; based on the probe flag being set to the first state, keep updates to recoverable resources in-flight while the user application is processing the transaction; based on the probe flag being set to the first state, roll back the updates to the recoverable resources in response to the user application ending processing the transaction; and send a readiness probe response to the requesting system based on how the user application ended processing the transaction.

20 Claims, 4 Drawing Sheets

(56) References Cited

U.S. PATENT DOCUMENTS

2022/0253848 A1\* 8/2022 Tatineni ................. G06Q 40/02
2023/0029624 A1 2/2023 Olejarz et al.
2023/0043307 A1 2/2023 Willoughby et al.

OTHER PUBLICATIONS

Anonymous, "Mainframe Tips, Tricks and Tutorials", https://www.mainframe-tips-and-tricks.blogspot.com/2017/09/, Sep. 25, 2017; 4 Pages.

Anonymous, "What is CICS Transaction Server for z/OS?", https://www.ibm.com/docs/en/cics-ts/beta?topic=what-is-cics-transaction-server-zos, Jan. 11, 2023; 2 Pages.

Kubernetes, "Configure Liveness, Readiness and Startup Probes", https://kubernetes.io/docs/tasks/configure-pod-container/configure-liveness-readiness-startup-probes/#define-readiness-probes, May 23, 2023; 12 Pages.

Roberts, "Liveness and Readiness Probes" https://cloud.redhat.com/blog/liveness-and-readiness-probes, Dec. 19, 2019; 7 Pages.

Colin Breck, "Kubernetes Liveness and Readiness Probes: How to Avoid Shooting Yourself in the Foot", https://blog.colinbreck.com/kubernetes-liveness-and-readiness-probes-how-to-avoid-shooting-yourself-in-the-foot/, Nov. 4, 2018; 9 Pages.

\* cited by examiner

TRANSACTIONAL READINESS PROBE

BACKGROUND

Aspects of the present invention relate generally to transactional systems and, more particularly, to a readiness probe for a transactional system.

A transactional system includes application servers that provide online transaction management and connectivity for applications. When starting up or scaling a transactional system, it is useful to know when the system is ready to process inbound workload.

SUMMARY

In a first aspect of the invention, there is a computer-implemented method including: initiating, by a processor set, a transaction in response to receiving a readiness probe request from a requesting system; setting, by the processor set, a probe flag for the transaction to a first state; sending, by the processor set, the transaction to a user application for processing; based on the probe flag being set to the first state, keeping, by the processor set, updates to recoverable resources in-flight while the user application is processing the transaction; based on the probe flag being set to the first state, rolling back, by the processor set, the updates to the recoverable resources in response to the user application ending processing the transaction; and sending, by the processor set, a readiness probe response to the requesting system based on how the user application ended processing the transaction.

In another aspect of the invention, there is a computer program product including one or more computer readable storage media having program instructions collectively stored on the one or more computer readable storage media. The program instructions are executable to: initiate a transaction in response to receiving a readiness probe request from a requesting system; set a probe flag for the transaction to a first state; send the transaction to a user application for processing; based on the probe flag being set to the first state, keep updates to recoverable resources in-flight while the user application is processing the transaction; based on the probe flag being set to the first state, roll back the updates to the recoverable resources in response to the user application ending processing the transaction; and send a readiness probe response to the requesting system based on how the user application ended processing the transaction.

In another aspect of the invention, there is a system including a processor set, one or more computer readable storage media, and program instructions collectively stored on the one or more computer readable storage media. The program instructions are executable to: initiate a transaction in response to receiving a readiness probe request from a requesting system; set a probe flag for the transaction to a first state; send the transaction to a user application for processing; based on the probe flag being set to the first state, keep updates to recoverable resources in-flight while the user application is processing the transaction; based on the probe flag being set to the first state, roll back the updates to the recoverable resources in response to the user application ending processing the transaction; and send a readiness probe response to the requesting system based on how the user application ended processing the transaction.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to transactional systems and, more particularly, to a readiness probe for a transactional system. When starting up a system or scaling a system it is useful to know when the system is ready to process inbound workload. This is not always when the application opens an external port. Especially in larger applications it is important that all elements of the system are ready. Cloud native solutions use a range of user defined probes to interrogate the system and check that all aspects are ready before the external connectivity is enabled. These probes typically involve a Hypertext Transfer Protocol (HTTP) GET request.

In a transactional system, writing such a probe is neither simple or effective as the user will want to ensure that the transactional nature of the system is working without having to run a transaction against real data or insert dummy data into the production environment. Writing a probe to handle this contains a level of risk and is a non-trivial task.

Legacy transactional systems often communicate with non-cloud native systems, such as databases, file systems, etc. Probes used in cloud native solutions (e.g., HTTP GET requests) do not check the readiness of non-cloud native systems linked by a legacy transactional system. Therefore, probes used in cloud native solutions do not accurately determine if all aspects of a legacy transactional system are ready for use.

In a large-scale transactional system, transactions are routed through instances of application servers, updating instances of recoverable resources and either 'sync pointing' or 'rolling back' the updates as necessary. In order to ensure that the entire solution is ready, the concept of a readiness probe is appealing. However, it is not enough to just run an element of a workload and check for a good response as the ideal workload to run will be transactional and require updates to data. This cannot be real data as that would affect a real client. Doing it against dummy data requires insertion of a dummy record in all used data stores and ignoring that dummy record during any processing that is reporting on the data. It also has the potential to suffer from the pesticide paradox where if the same record is always used to test readiness, changes to the application and the real data might not get adequately tested by the dummy data probe.

Implementations of the invention address these problems by providing a readiness probe for transactional systems, where the readiness probe drives a hosted application with a real transaction but does not disturb the underlying recoverable resources. In embodiments, a transaction server hosts an application, and the readiness probe drives the hosted application with a randomized historic transaction that is marked with a probe flag. The hosted application processes the transaction against the actual recoverable resources (i.e., the real underlying data) as it would any other transaction; however, before any in-flight updates arising from the transaction are hardened (e.g., committed), the transaction server rolls back all such in-flight updates based on the transaction having the probe flag. In addition to rolling back the in-flight updates, the transaction server provides a readiness probe response of either success (i.e., the application is ready) or failure (i.e., the application is not ready). By driving the hosted application with a real transaction against the actual recoverable resources, the readiness probe provides an improvement in the field of transactional systems by ensuring that the hosted application is ready to run from an end-to-end perspective, rather than simply interrogating the front end for a response (e.g., with an HTTP GET request).

Implementations may be used with legacy transactional systems that communicate with non-cloud native systems since the readiness probe is not interrogating each linked system individually, but rather is testing the readiness of the hosted application itself with a real transaction. If any of the linked systems are not ready, then this will be manifested in the application itself not being ready, which avoids the need to interrogate each linked system individually. In this manner, implementations of the invention provide an improvement over conventional probes that do not accurately test the readiness of applications hosted in legacy transactional systems.

In accordance with aspects of the invention, there is a method, system, and computer program product for applying an application centric readiness probe against a shared clustered transactional processing system. In embodiments, there is a system to mark an instance of a transactional workload as a probe. In embodiments, there is a mechanism in which the transactional probe can be executed to validate the correct configuration of the system. In embodiments, updates to transactional and non-transactional data can be correctly maintained to suit the nature of the probe.

Implementations of the invention are necessarily rooted in computer technology. For example, embodiments include performing a readiness probe by executing a transaction in an application hosted by an application server and rolling back in-flight updates associated with the transaction (e.g., reverting the recoverable resources to their pre-transaction state). These steps are computer-based and cannot be performed in the human mind or with pen and paper.

Moreover, despite utilizing transactions, implementations are not directed to performing commercial or business transactions. Instead, implementations are directed to testing the readiness of a system. As such, implementations are not directed to the transactions themselves, but rather are directed to a readiness probe for determining the readiness of a system to perform future ones of the transactions.

It should be understood that, to the extent implementations of the invention collect, store, or employ personal information provided by, or obtained from, individuals (for example, personal information associated with transactions), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
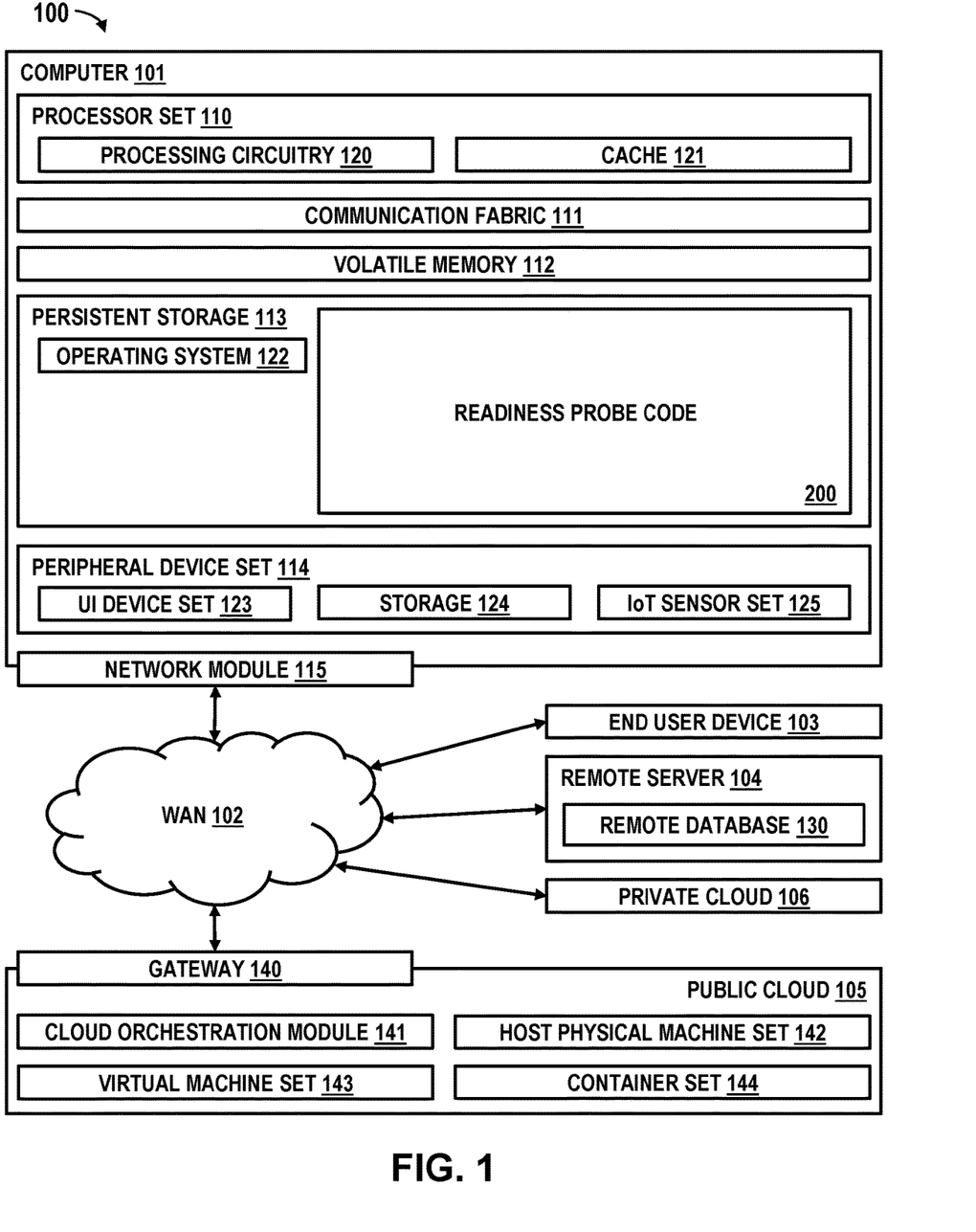
FIG. 1 depicts a computing environment according to an embodiment of the present invention.

Computing environment 100 contains an example of an environment for the execution of at least some of the computer code involved in performing the inventive methods, such as readiness probe code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
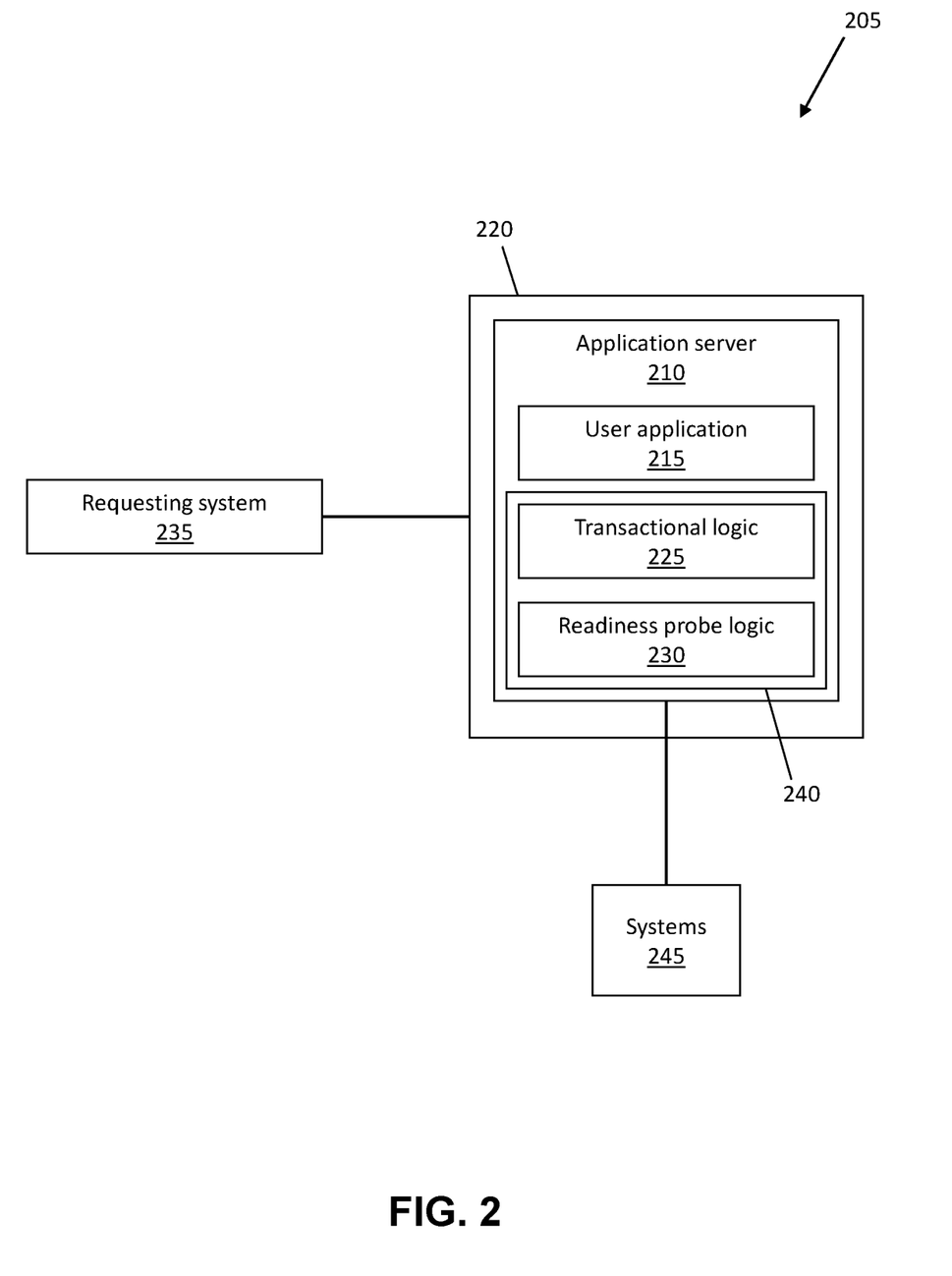
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes an application server 210 that hosts a user application 215. The application server 210 may comprise middleware that runs on a computing device 220. The computing device 220 may comprise one or more instances of the computer 101 of FIG. 1, or one or more virtual machines or containers running on one or more instances of the computer 101 of FIG. 1. In one example, the application server 210 comprises one of a family of application servers that make up a transactional system. The family may be a family of mixed-language application servers that provide online transaction management and connectivity for multiple different applications including user application 215. In a non-limiting example, the application server 210 comprises an instance of a Customer Information Control System (CICS) transaction server.

The user application 215 comprises user application code (e.g., a program) that runs on the application server 210. The user application 215 carries out user-defined processing to execute a transaction provided to it by the application server 210. Examples of types of transactions include banking transactions, sales transaction, and data transfer transactions.

In embodiments, the application server 210 of FIG. 2 comprises transactional logic 225 and readiness probe logic 230. The readiness probe logic 230 may comprise or be comprised in the code of block 200 of FIG. 1 and may be used to carry out the functions and/or methodologies of embodiments of the invention as described herein. For example, the readiness probe logic 230 may include routines, programs, objects, components, logic, data structures, and so on that perform particular tasks or implement particular data types that the code of block 200. These modules of the code of block 200 are executable by the processing circuitry 120 of FIG. 1 to perform the inventive methods as described herein.

In accordance with aspects of the invention, the transactional logic 225 is configured to perform transactional processes of the application server 210. For example, the transactional logic 225 may provide a transaction to the user application 215, receive API calls from the user application 215, and perform processing in the transactional system (e.g., hardening of updates, etc.) based on the user application 215 executing a transaction.

In accordance with aspects of the invention, the readiness probe logic 230 is configured to receive a readiness probe request from a requesting system 235. In response to receiving the readiness probe request, the readiness probe logic 230 obtains a historic transaction, sets a probe flag for this transaction to 'ON', and causes the transactional logic 225 to drive the transaction into the user application 215 (e.g., invoke execution of the transaction by the user application 215). Based on the flag being set to ON for this transaction, the readiness probe logic 230 causes the transactional logic 225 to keep all updates to transactional resources in-flight for this transaction, meaning that the transactional logic 225 does not harden any updates for this transaction. As used herein, an in-flight update refers to a change to a recoverable resource that is caused by the transaction but not yet hardened (e.g., committed) in the data of the recoverable resource. In embodiments, in response to the user application 215 ending execution of the transaction (either normally or abnormally), the readiness probe logic 230 causes the transactional logic 225 to remove (e.g., roll back) the in-flight updates to recoverable resources associated with this transaction. In embodiments, in response to the user application 215 ending execution of the transaction (either normally or abnormally), the readiness probe logic 230 send a readiness probe response to the requesting system 235, the readiness probe response indicating either success (i.e., the user application 215 is ready) or failure (i.e., the user application 215 is not ready).

The requesting system 235 may comprise a system aggregator, such as a controller in a container orchestration management system (e.g., Kubernetes) that manages a reference to an instance of the application server 210 in a transactional system. The requesting system 235 may be on the same computing device 220 as the application server 210, on a different computing device in a same cluster as the application server 210, or remote from the application server 210. The requesting system 235 may communicate with the application server 210 via a network such as the WAN 102 of FIG. 1.

In accordance with aspects of the invention, the readiness probe logic 230 is implemented in the runtime (e.g., the application server 210) that encapsulates the user application 215, rather than being in the user application 215 itself. This allows the readiness probe logic 230 to make system level calls to alter the behavior of the transactional logic 225 based on the probe flag of the transaction. In this manner, embodiments of the invention may be implemented without requiring the user to make any changes to their user application 215.

As shown in FIG. 2, the environment 205 may include one or more systems 245 with which the application server 210 and/or the user application 215 communicate while executing a transaction. These systems 245 may include databases, file systems, etc. These systems 245 may store data that constitute the recoverable resources that are accessed (and potentially changed) in a transaction. In embodiments, one or more of these systems 245 is non-cloud native.

The application server 210 may include additional or fewer logic modules than those shown in FIG. 2. In embodiments, separate modules may be integrated into a single module. In one example, the transactional logic and the readiness probe logic 230 are included in a system management controller 240. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
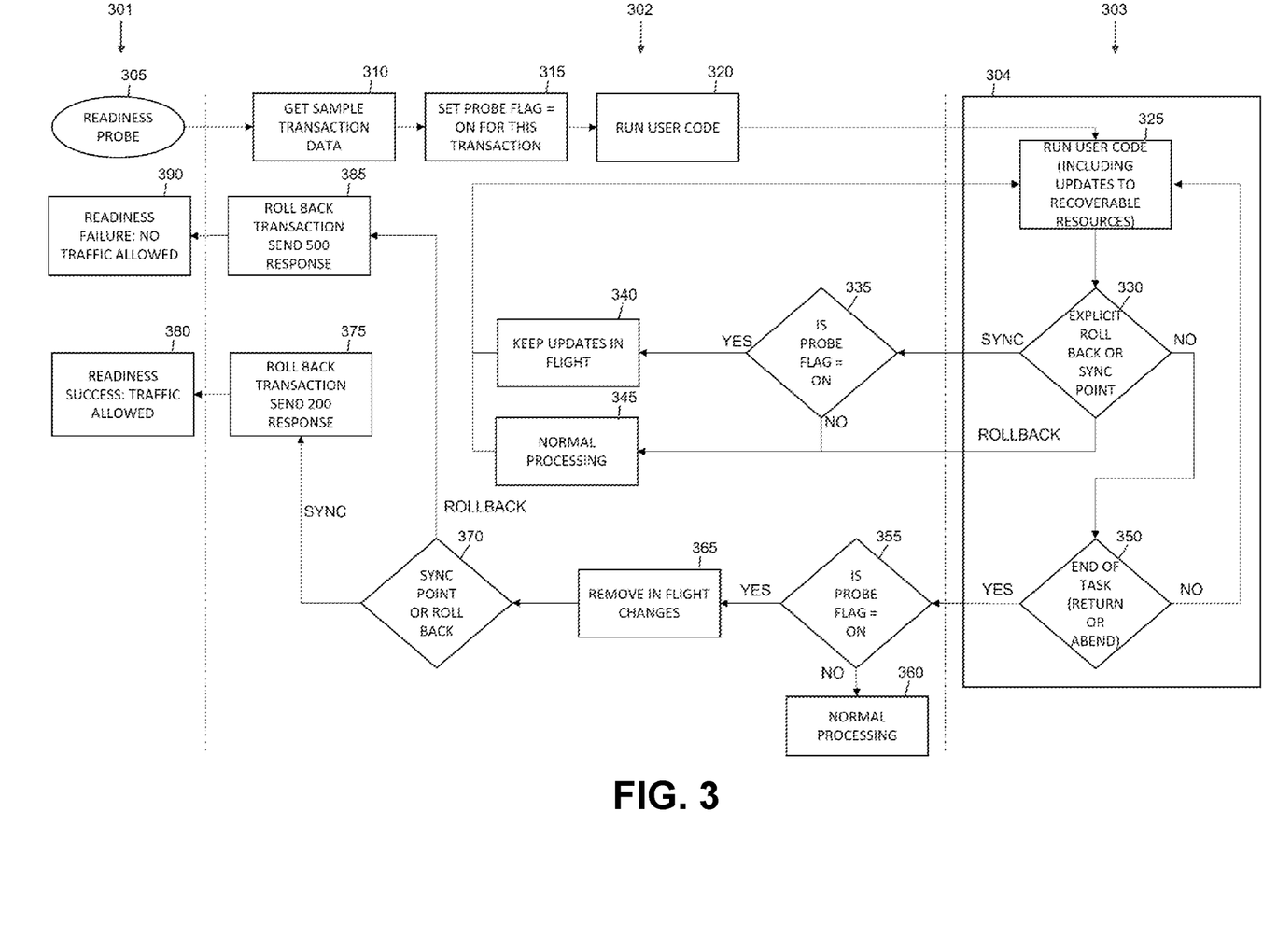
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

In FIG. 3, area 301 corresponds to the requesting system 235, area 302 corresponds to the application server 210, and area 303 corresponds to the user application 215. Block 304 corresponds to a code execution loop of the user application 215.

In embodiments, during execution of an application through a transaction processing system, the data used to drive each component of the system (e.g., channels on containers, IP interconnectivity (IPIC) connection links, etc.) are sampled and captured. Along with this data, the system and the group that the system belongs to is noted as well as the response from the target system. This set of information is then kept within the transaction processing system for use as part of a readiness probe.

In embodiments, the system management controller 240 of the application server 210 (shown in FIG. 2) opens an API endpoint that can be consumed by the requesting system 235 to drive the readiness probe (at 305). On receipt of a readiness probe request from the requesting system 235, the system management controller 240 sets the readiness probe flag to ON (at 315) and drives the transaction (at 320) to test the readiness of the system. When running the transaction, the probe flag is set to ON to notify the system that a readiness probe is being executed. This alters the transactionality of the application such that all updates to transactional resources are kept in-flight as normal, but at the point of an explicit or implicit sync point, the updates are rolled back (instead of hardened), and then a readiness response is given. This allows for all aspects of the system to be tested and verified to be working, without updating any data within the system. The probe flag may be stored in any suitable manner and is envisioned to be transactional processor dependent for different systems.

In particular, at step 305 the requesting system 235 initiates a readiness probe request to test the readiness of the user application 215 running on the application server 210. This may be performed using an API call to the application server 210.

At step 310, the application server 210 obtains sample transaction data. In embodiments, the application server 210 obtains data about a real transaction that occurred at a previous date and time (i.e., as opposed to a dummy transaction). At step 315, the application server 210 sets a probe flag for this transaction to ON (i.e., a first state). At step 320, the application server 210 runs the user code by driving the transaction to the user application 210 (e.g., to initiate execution user application for processing the transaction).

At step 325, the user application 215 runs its code, thereby processing the transaction, including updates to recoverable resources. In this context, recoverable resources refers to data that may be modified as part of the transaction, such as bank account data, seller data, buyer data, etc. At step 330, the user application 215 determines whether there is an explicit roll back or sync point or neither in the code, and performs the related API call to process that action. If at step 330 there is an explicit sync point in the code, then at step 335 the user application determines whether the probe flag is ON. If the probe flag is ON at step 335, then at step 340 the application server 210 keeps the updates to the recoverable resources in-flight. If the probe flag is OFF at step 335, then at step 345 the application server 210 performs normal transactional processing in the form of hardening any in-flight updates to the recoverable resources. Following either step 340 or 345, the process returns to step 325 to continue running the user code. If at step 330 there is an explicit roll back in the code, then the process proceeds to step 345 as already described. If at step 330 there is neither an explicit roll back or sync point, then the process proceeds to step 350 where the user application 215 determines whether there is an end of task (either a normal return or an abnormal end). If an end of task is not detected at step 350, then the process returns to step 325 to continue running the user code. If an end of task is detected at step 350, then the process proceeds to step 355.

At step 355, the application server 210 determines whether the probe flag is ON for this transaction. If it is not, then at step 360 the application server 210 performs normal transactional processing in the form of hardening any in-flight updates to the recoverable resources. If the probe flag is ON at step 355, then this indicates that this transaction was processed as part of a readiness probe, and that any associated changes to the data should be discarded. Therefore, at step 365 the application server 210 remove all in-flight changes to the recoverable resources that arise from processing this transaction. In embodiments, removing the in-flight changes comprises reverting the recoverable resources (e.g., the underlying data) to the state it was in immediately prior to the processing of this transaction. In this manner, all changes that this transaction caused to the data (e.g., changed bank account balances) are rolled back without being hardened (e.g., finalized).

At step 370, the application server 210 determines whether the end of task at step 350 corresponds to a sync point (i.e., a normal/expected end of task) or a roll back (i.e., an abnormal/unexpected end of task). If the end of task at step 350 corresponds to a sync point end of task (i.e., a normal/expected end of task in which the user application ends processing of the transaction in an expected manner), then at step 375 the application server 210 rolls back the transaction and sends to the requesting system 235 a readiness probe response indicating success (i.e., the user application 215 is ready). The response may be an "HTTP 200" response, for example. A non-limiting example of ending in an expected manner is when the user application returns a result without an error. In this way, the readiness probe response indicates success based on the user application ending processing of the transaction in an expected manner. At step 380 the requesting system 235 receives the readiness probe response indicating success and allows normal traffic to be directed to the user application 215.

If the end of task at step 350 corresponds to a roll back end of task (i.e., an abnormal/unexpected end of task in which the user application ends processing of the transaction in an unexpected manner), then at step 385 the application server 210 rolls back the transaction and sends to the requesting system 235 a readiness probe response indicating failure (i.e., the user application 215 is not ready). The response may be an "HTTP 500" response, for example. A non-limiting example of ending in an unexpected manner is when the user application returns an error. In this way, the readiness probe response indicates failure based on the user application ending processing of the transaction in an unexpected manner. At step 390 the requesting system 235 receives the readiness probe response indicating failure and does not allow normal traffic to be directed to the user application 215.

Figure 4:
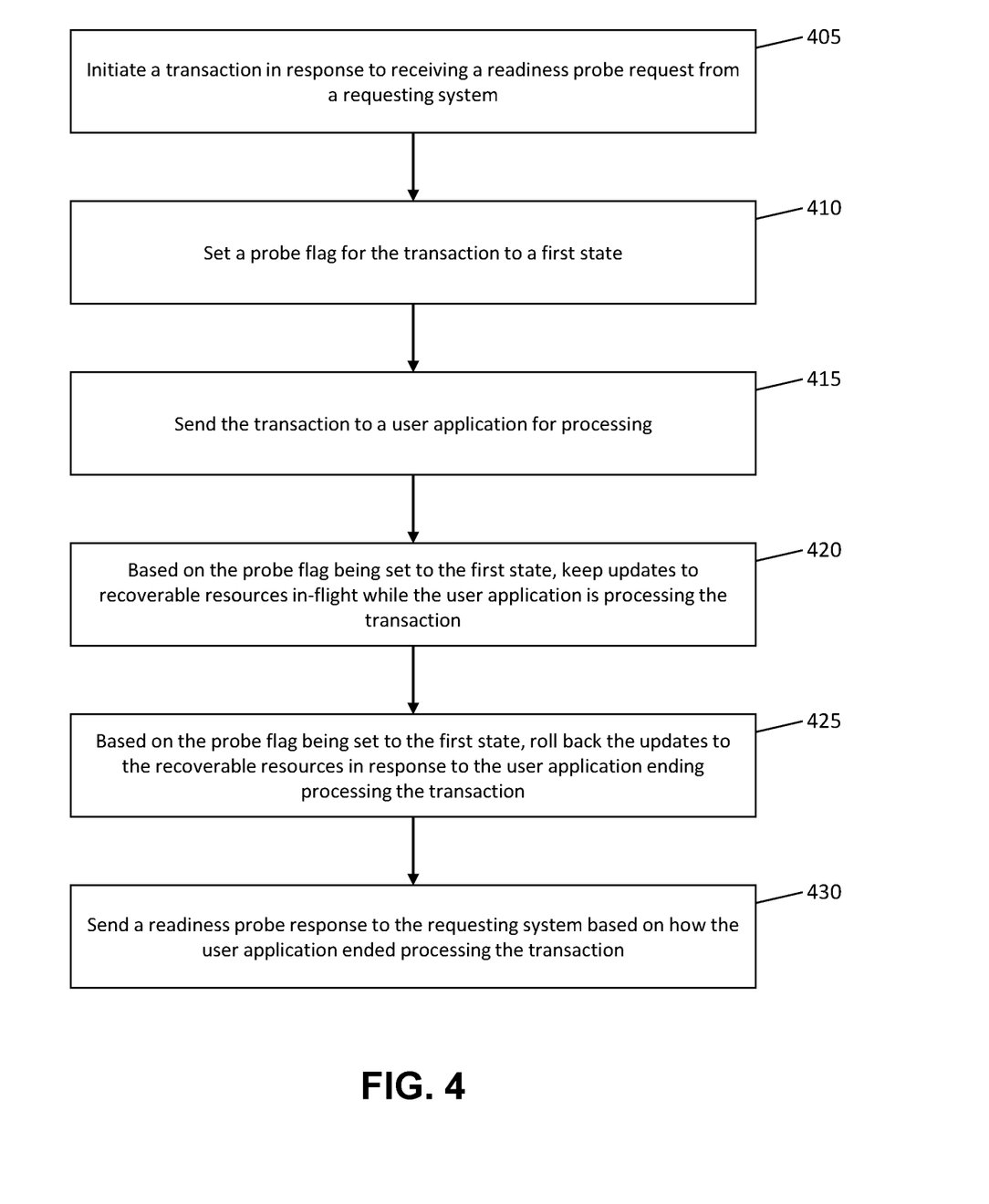
FIG. 4 shows a flowchart of an exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

At step 405, the system initiates a transaction in response to receiving a readiness probe request from a requesting system. In embodiments, the application server receives a readiness probe request from a requesting system. In embodiments, in response to receiving the request, the application server initiates a transaction in the application server by obtaining data of a historic transaction. The initiating may include other steps performed by the application server between receiving a request for a transaction and driving the transaction into a user application. This may be performed as described at step 310 of FIG. 3.

At step 410, the system sets a probe flag for the transaction to a first state. In embodiments, the application server sets a probe flag to ON for the transaction. This may be performed as described at step 315 of FIG. 3.

At step 415, the system send the transaction to a user application for processing. In embodiments, the application server drives the transaction into the user application. This may be performed as described at step 320 of FIG. 3.

At step 420, based on the probe flag being set to the first state, the application server keeps updates to recoverable resources in-flight while the user application is processing the transaction. This may be performed as described at step 340 of FIG. 3.

At step 425, based on the probe flag being set to the first state, the system rolls back the updates to the recoverable resources in response to the user application ending processing the transaction. In embodiments, the application server rolls back in-flight changes after the transaction reaches an end of task point. This may be performed as described at step 365 of FIG. 3.

At step 430, the system sends a readiness probe response to the requesting system based on how the user application ended processing the transaction. This may be performed as described at one of steps 375 and 385 of FIG. 3.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG.

1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   initiating, by a processor set, a transaction in response to receiving a readiness probe request from a requesting system;
   setting, by the processor set, a probe flag for the transaction to a first state;
   sending, by the processor set, the transaction to a user application for processing;
   based on the probe flag being set to the first state, keeping, by the processor set, updates to recoverable resources in-flight while the user application is processing the transaction;
   based on the probe flag being set to the first state, rolling back, by the processor set, the updates to the recoverable resources in response to the user application ending processing the transaction; and
   sending, by the processor set, a readiness probe response to the requesting system based on how the user application ended processing the transaction.

2. The computer-implemented method of claim 1, wherein the user application runs in an application server.

3. The computer-implemented method of claim 2, wherein the application server is one of plural application servers in a transactional system.

4. The computer-implemented method of claim 3, wherein the requesting system comprises a system aggregator of the transactional system.

5. The computer-implemented method of claim 1, wherein the transaction is initiated using data of a historic transaction.

6. The computer-implemented method of claim 1, wherein the readiness probe response indicates success based on the user application ending processing of the transaction in an expected manner.

7. The computer-implemented method of claim 1, wherein the readiness probe response indicates failure based on the user application ending processing of the transaction in an unexpected manner.

8. The computer-implemented method of claim 1, wherein the rolling back the updates to the recoverable resources comprises reverting the recoverable resources to a pre-transaction state.

9. A computer program product comprising one or more computer readable storage media having program instructions collectively stored on the one or more computer readable storage media, the program instructions executable to:
   initiate a transaction in response to receiving a readiness probe request from a requesting system;
   set a probe flag for the transaction to a first state;
   send the transaction to a user application for processing;
   based on the probe flag being set to the first state, keep updates to recoverable resources in-flight while the user application is processing the transaction;
   based on the probe flag being set to the first state, roll back the updates to the recoverable resources in response to the user application ending processing the transaction; and
   send a readiness probe response to the requesting system based on how the user application ended processing the transaction.

10. The computer program product of claim 9, wherein:
    the user application runs in an application server;
    the application server is one of plural application servers in a transactional system; and
    the requesting system comprises a system aggregator of the transactional system.

11. The computer program product of claim 9, wherein the transaction is initiated using data of a historic transaction.

12. The computer program product of claim 9, wherein the readiness probe response indicates success based on the user application ending processing of the transaction in an expected manner.

13. The computer program product of claim 9, wherein the readiness probe response indicates failure based on the user application ending processing of the transaction in an unexpected manner.

14. The computer program product of claim 9, wherein the rolling back the updates to the recoverable resources comprises reverting the recoverable resources to a pre-transaction state.

15. A system comprising:
    a processor set, one or more computer readable storage media, and program instructions collectively stored on the one or more computer readable storage media, the program instructions executable to:
    initiate a transaction in response to receiving a readiness probe request from a requesting system;
    set a probe flag for the transaction to a first state;
    send the transaction to a user application for processing;
    based on the probe flag being set to the first state, keep updates to recoverable resources in-flight while the user application is processing the transaction;
    based on the probe flag being set to the first state, roll back the updates to the recoverable resources in response to the user application ending processing the transaction; and
    send a readiness probe response to the requesting system based on how the user application ended processing the transaction.

16. The system of claim 15, wherein:
    the user application runs in an application server;
    the application server is one of plural application servers in a transactional system; and
    the requesting system comprises a system aggregator of the transactional system.

17. The system of claim 15, wherein the transaction is initiated using data of a historic transaction.

18. The system of claim 15, wherein the readiness probe response indicates success based on the user application ending processing of the transaction in an expected manner.

19. The system of claim 15, wherein the readiness probe response indicates failure based on the user application ending processing of the transaction in an unexpected manner.

20. The system of claim 15, wherein the rolling back the updates to the recoverable resources comprises reverting the recoverable resources to a pre-transaction state.

* * * * *